(12) United States Patent
Lange

(10) Patent No.: US 6,581,951 B2
(45) Date of Patent: Jun. 24, 2003

(54) MOTION-DAMPENING FIFTH-WHEEL HITCH

(76) Inventor: Dennis Lange, 25404 Apple Rd., Waterford, WI (US) 53185

( * ) Notice: Subject to any disclaimer, the term of this patent is extended or adjusted under 35 U.S.C. 154(b) by 0 days.

(21) Appl. No.: 09/800,032

(22) Filed: Mar. 6, 2001

(65) Prior Publication Data

US 2002/0125683 A1 Sep. 12, 2002

(51) Int. Cl.⁷ .............................................. B62D 53/06
(52) U.S. Cl. ...................... 280/440; 280/339; 280/489
(58) Field of Search ................................. 280/439, 440, 280/405.1, 407, 407.1, 433, 438.1, 483, 484, 489

(56) References Cited

U.S. PATENT DOCUMENTS

| | | | |
|---|---|---|---|
| 1,324,777 A | 12/1919 | Barber | |
| 1,863,120 A | 6/1932 | Martin | |
| 2,821,409 A | 1/1958 | Chalmers | |
| 2,996,312 A | * 8/1961 | Paul | 280/439 |
| 3,020,065 A | * 2/1962 | Sandefur | 280/439 |
| 3,035,855 A | * 5/1962 | Harris | 280/439 |
| 3,137,515 A | * 6/1964 | Masser | 280/440 |
| 3,227,470 A | 1/1966 | Funk | |
| 3,253,840 A | 5/1966 | Granning | |
| 3,380,758 A | 4/1968 | Granning | |
| 3,399,907 A | 9/1968 | Hein | |
| 3,439,935 A | * 4/1969 | Guidice | 280/440 |
| 3,486,768 A | * 12/1969 | Masser | 280/440 |
| 3,580,609 A | 5/1971 | Paielli | |
| 3,717,273 A | 2/1973 | Berends | |
| 4,279,430 A | 7/1981 | Tagg et al. | |
| 4,566,716 A | 1/1986 | Modat | |
| 4,580,806 A | 4/1986 | Kolstad et al. | |
| 4,861,060 A | 8/1989 | Schult et al. | |
| 4,961,564 A | 10/1990 | Schult et al. | |
| 5,203,850 A | 4/1993 | Harrold | |
| 5,226,675 A | 7/1993 | Noah et al. | |
| 5,328,198 A | 7/1994 | Adams | |
| 5,639,106 A | 6/1997 | Vitale et al. | |
| 5,765,849 A | 6/1998 | Moulton et al. | |
| 5,785,341 A | 7/1998 | Fenton | |
| 5,964,476 A | 10/1999 | Maines | |
| 6,170,849 B1 | * 1/2001 | McCall | 280/439 |

FOREIGN PATENT DOCUMENTS

| | | | | |
|---|---|---|---|---|
| DE | 1924717 | * 11/1979 | | 280/439 |
| FR | 562553 | * 11/1923 | | 280/439 |
| FR | 1324996 | * 3/1963 | | 280/440 |

* cited by examiner

Primary Examiner—Daniel G. DePumpo
(74) Attorney, Agent, or Firm—Jansson, Shupe & Munger, Ltd.

(57) ABSTRACT

The invention involves a connector apparatus for attaching a trailer to a towing vehicle. The invention has a base structure with a kingpin-receiving plate attached with respect to the top of the base structure and pivotable with respect thereto about a substantially horizontal cross-axis. The invention also has a front bottom deck with an upper surface, attached with respect to the front side of the base structure; a rear bottom deck with an upper surface, attached with respect to the rear side of the base structure; a front top deck with a lower surface, attached with respect to the front side of the kingpin-receiving plate thereby defining a gap of a distance between the upper surface of the front bottom deck and the lower surface of the front top deck; a rear top deck with a lower surface, attached with respect to the rear side of the kingpin-receiving plate thereby defining a gap of a distance between the upper surface of the front bottom deck and the lower surface of the front top deck; and resilient, motion-dampening devices between the upper surfaces of the bottom decks and the lower surfaces of the top deck whereby a change in the distance between the upper surface of the bottom deck and the lower surface of the top deck is resisted.

10 Claims, 3 Drawing Sheets

MOTION-DAMPENING FIFTH-WHEEL HITCH

FIELD OF THE INVENTION

This invention is related generally to motor vehicles and, more particularly, to connectors between a towing vehicle and a trailing vehicle.

BACKGROUND OF THE INVENTION

Many trailer-tow vehicle combinations are coupled together with a "fifth-wheel" hitch. The hitch commonly is composed of a male kingpin on the trailer which couples with a female receiving plate attached by a frame with respect to the towing vehicle. This arrangement allows rotation of the kingpin within the plate in the plane of the traveled roadway to facilitate turning maneuvers. The plate is further attached to its frame in such a manner that it can pivot vertically about an axis to facilitate coupling and to provide a flex point in order that the towed vehicle can go up an incline out of a trough at the same time the trailer is going down an incline into a trough. While this hitch allows for relative motion, it maintains a mechanical connection between the vehicles through which non-rotational, vertical, inertial motion is translated between the vehicles.

The hitch type is used in the trucking industry coupling semi-tractor/trailer combinations. The hitch also has non-industrial application such as in the towing of a camper or small mobile home through the use of a pick-up truck. When used in the non-industrial setting, a frame supporting a standardized hitch is installed into the bed of a pick-up truck, typically through the bolting of the hitch into the bed of the truck.

It has long been recognized that occupants of the cab of a towing vehicle will experience discomfort due to vibrations of the trailer translated through the hitch. These vibrations are created in part because of relative motion between the two coupled vehicles as they pass over the discontinuities on the surface of roads at different times. These discontinuities include, but are not limited to, ruts, potholes, waves, and small peaks and valleys on the road surface.

The use of air bellows to address the relative motion of the two vehicles is not novel.

Eight patents have been issued which attempt to address the problem by placing the motion-dampening bellows between the frame of the towing vehicle and the fifth-wheel frame.

The Schult et al. U.S. Pat. No. 4,961,546, Hein U.S. Pat. No. 3,399,907, and Fenton U.S. Pat. No. 5,785,341 all seek to address the vibrational problem through the placement of air bellows-type devices between the kingpin and the trailer.

Granning U.S. Pat. No. 3,380,758, Berends U.S. Pat. No. 3,717,273, Tagg et al. U.S. Pat. No. 4,279,430, Modat U.S. Pat. No. 4,566,716, Adams U.S. Pat. No. 5,328,198, Vitale et al. U.S. Pat. No. 5,639,106, Kolstad et al. U.S. Pat. No. 4,580,806, and Harrold U.S. Pat. No. 5,203,850 attempt to address the vibrational coupling problem by placing the air bellows between the frame of the fifth-wheel mount and the frame of the towing vehicle. Such an arrangement addresses the vertical inertia but does not address the rotational inertia felt about the pivot of the fifth-wheel plate.

Chalmers (U.S. Pat. No. 2,821,409) attempted to address the rotational inertia problem through a complex system involving air bellows. In addition to the pivot of the fifth-wheel plate in relation to its mounting, Chalmers introduced two other pivots, the first between the fifth-wheel frame and the towing vehicle frame and the second pivot between the kingpin and the trailer. Chalmers then introduced an air bag to the aft of the kingpin between the kingpin plate and the trailer and a second air bellow between the fifth-wheel frame and the towing vehicle frame.

Conversely, Funk (U.S. Pat. No. 3,227,470) attempts to dampen rotational inertia by placing an air bellow between the towing vehicle and the trailing vehicle irrespective of the fifth-wheel plate pivot point.

There is a need for improvement in the fifth-wheel hitches of the prior art which provide significantly less translation of vibration from the trailer to the cab of the towing vehicle.

OBJECTS OF THE INVENTION

It is an object of this invention to provide an improved connector apparatus for detachably, attaching a trailing vehicle to a towing vehicle overcoming some of the problems and shortcomings of the prior art.

Another object of this invention is dampening the relative motion transmitted between the towing vehicle and the trailing vehicle due to the unevenness of the traveled surface.

Another object is to provide a smoother ride for the occupants of the cab of a towing vehicle.

Yet another object of the invention is to provide a motion-dampening device that does not require modification of the kingpin hitch of the trailing vehicle.

It is also an object of this invention to provide a motion-dampening device suitable for use by non-commercial consumers who pull personal-use trailers with lighter-duty towing vehicles.

It is still another object of this invention to provide a dampening device that is adjustable depending on the load of the trailer.

It is yet another object of this invention to provide a motion-dampening device which may be retrofit onto a towing vehicle without the need for new mounting fittings.

Still another object of the invention is to provide a dampening device which may be integrated as part of a towing vehicle.

These and other objects of the invention will be apparent from the following descriptions and from the drawings.

SUMMARY OF THE INVENTION

The invention involves a novel connector apparatus for detachably, attaching a trailing vehicle to a towing vehicle, comprising: a base structure having a top, and front and rear portions; a kingpin-receiving plate having a front side and a back side, attached with respect to the top of the base structure and pivotable with respect thereto about a substantially horizontal cross-axis; a front bottom deck with an upper surface, attached with respect to the front side of the base structure; a rear bottom deck with an upper surface, attached with respect to the rear side of the base structure; a front top deck with a lower surface, attached with respect to the front side of the kingpin-receiving plate thereby defining a gap of a distance between the upper surface of the front bottom deck and the lower surface of the front top deck; a rear top deck with a lower surface, attached with respect to the rear side of the kingpin-receiving plate thereby defining a gap of a distance between the upper surface of the front bottom deck and the lower surface of the front top deck; and resilient, motion-dampening devices between the upper surfaces of the bottom decks and the lower surfaces of the top decks whereby a change in the distance between the upper surface of the bottom deck and the lower surface of the top deck is resisted. The kingpin-receiving plate is not necessarily flat and can be more saddle-like.

In one preferred embodiment, the resilient motion-dampening device is fluid filled. It is preferred that the fluid-filled resilient motion-dampening device is an air bellow. In another embodiment of this version of the invention, a plurality of shock absorbers is attached with respect to the top decks and bottom decks. It is most preferred that a pair of shock absorbers is attached with respect to the top decks and the base.

Another aspect of this invention is a novel connector apparatus for detachably, attaching a trailing vehicle to a towing vehicle, comprising: a base structure having a top, and front and rear portions; a fifth-wheel plate having a front side and a back side, attached with respect to the top of the base structure and pivotable with respect thereto about a substantially horizontal cross-axis; a front deck with an upper surface, attached with respect to the towing-vehicle bed on the front side of the base structure; a rear deck with an upper surface, attached with respect to the towing-vehicle bed on the rear side of the base structure; a front arm with a lower surface, attached with respect to the front side of the fifth-wheel plate thereby defining a gap of a distance between the upper surface of the front deck and the lower surface of the front arm; a rear arm with a lower surface, attached with respect to the rear side of the fifth-wheel plate thereby defining a gap of a distance between the upper surface of the front deck and the lower surface of the front arm; and resilient, motion-dampening devices between the upper surfaces of the bottom decks and the lower surfaces of the arms whereby a change in the distance between the upper surface of the bottom deck and the lower surface of the arm is resisted.

In a preferred embodiment of this aspect of the invention, the resilient motion-dampening devices are fluid filled. It is highly preferred that the fluid-filled resilient motion-dampening devices are air bellows. In addition to the air bellows, it is preferable to include a plurality of shock absorbers attached with respect to the top decks and bottom decks. It is most preferred that the plurality of shock absorbers constitute a pair of shock absorbers attached with respect to the arms and the base.

It is another aspect of this invention to provide an improvement to a connector apparatus for detachably attaching a trailing vehicle to a towing vehicle, of the fifth-wheel type having a kingpin-receiving plate pivotably attached to a base mounted to a bed of the towing vehicle, wherein the improvement comprises: a forward top plate with a lower face, attached with respect to the kingpin-receiving plate; a rearward top plate with a lower face, attached with respect to the kingpin-receiving plate; and resilient, motion-dampening devices between the lower surfaces of the top decks and the bed of the towing vehicle whereby a change in the distance between the lower surface of the top deck and the bed of the towing vehicle is resisted.

It is preferred that the motor vehicle connector further include resilient motion-dampening devices which are fluid filled. It is more preferable that the fluid-filled resilient motion-dampening devices are air bellows. In another embodiment of this version of the invention, a plurality of shock absorbers are attached with respect to the top decks and bottom decks. It is most preferred that a pair of shock absorbers is attached with respect to the top decks and the base.

BRIEF DESCRIPTION OF THE DRAWINGS

The drawings illustrate preferred embodiments which include the above-noted characteristics and features of the invention. The invention will be readily understood from the descriptions and drawings. In the drawings.

DETAILED DESCRIPTION OF PREFERRED EMBODIMENTS

Figure 1:
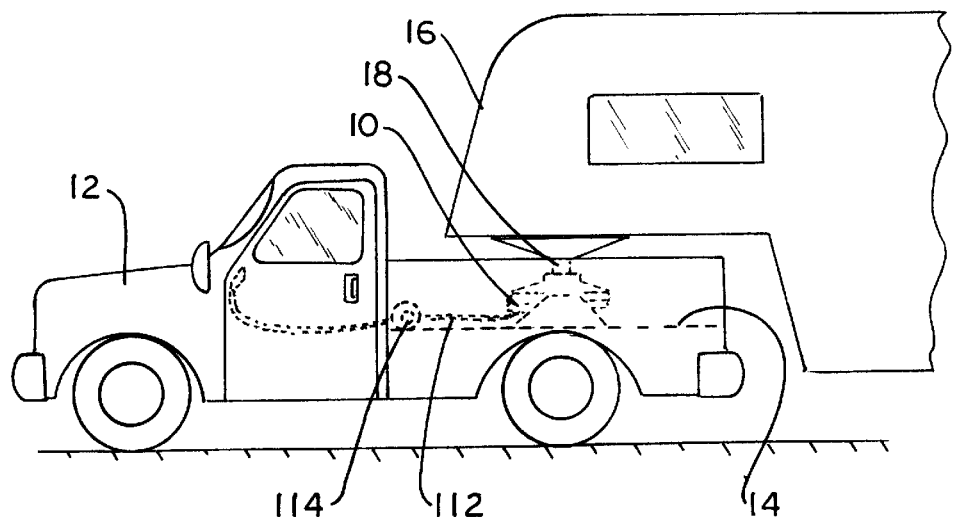
FIG. 1 is a side view of a preferred connector apparatus for detachably, attaching a trailing vehicle to a towing vehicle in accordance with this invention.

The fifth-wheel hitch unit 10 of the present invention is shown in FIG. 1 in use attached to a towing truck 12. Truck 12 is an open bed, pick-up-type truck. As will be better seen in FIG. 2, fifth-wheel hitch unit 10 is fixedly attached to the truck bed 14. The trailer 16 comes pre-fit with a standard king pin assembly 18.

Figure 2:
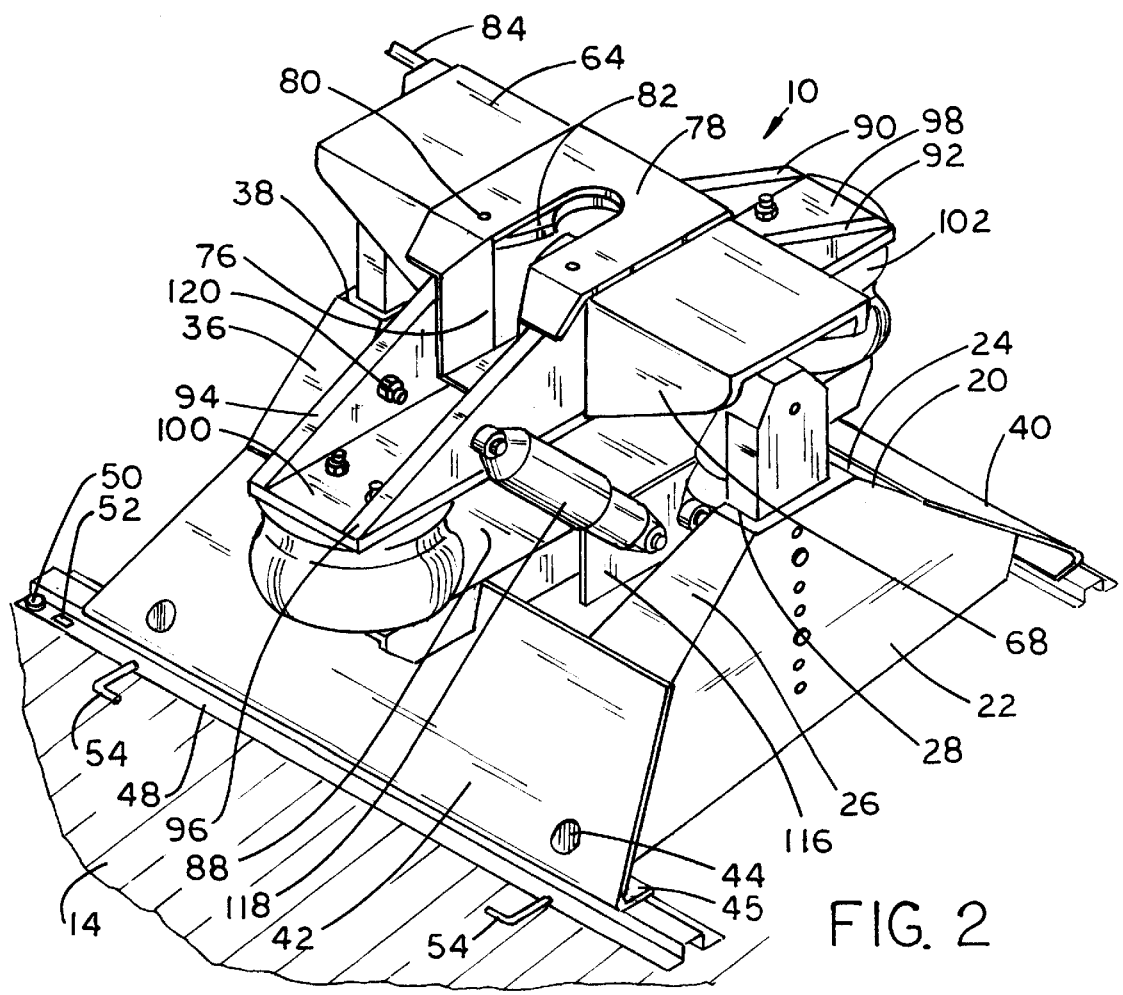
FIG. 2 is a perspective view of the connector apparatus of FIG. 1.

FIG. 2 shows a perspective view of fifth-wheel hitch 10. The base frame is comprised of several parts. The right side 20 is formed of heavy-gauge sheet metal and has a solid, vertical, equilateral trapezoidal face 22. Extending perpendicularly inward from right-side vertical face 22 are the right-side fore angular face 24 and the right-side aft angular face 26. Extending inward from right-side vertical face 22 and attached to the top edges of right-side fore angular face 24 and right-side aft angular face 26, is the right-side top horizontal shelf 28. The left side 30 is a mirror image of right side 20, having left-side vertical face 32, left-side fore angular face 34, left-side aft angular face 36, and left-side top horizontal shelf 38.

A trapezoidal piece of heavy-gauge sheet metal having a base edge of about twenty-eight inches and an upper edge of about twenty-four inches, is attached to the bottom of right-side fore angular face 26 and left-side fore angular face 36 to create fore apron 40. A like trapezoidal piece is welded to the bottom of right-side aft angular face 24 and left-side aft angular face 34 to create aft apron 42. Said welding is facilitated by the presence of weld holes 44. As better seen in FIG. 3, approximately two inches of the bottom edge of each of fore apron 40 and aft apron 42 are folded horizontally inwardly to create an elongated foot 45. From each foot 45 are cut two locking-pin tabs 46 which depend vertically down from foot 45. Each locking-pin tab 46 is about one and one half inches wide and has a locking-pin-receiving hole 47 in the center. Locking-pin tab 46 has an outer edge located about four inches in from the outer edge of the respective apron 40, 42.

Two elongated mounting brackets 48 are attached to truck bed 14 parallel to the axle of truck 12 and centered with respect to the width of bed 14, each by four mounting bolts 50 attached through pairs of mounting bracket holes 52 located near the ends of mounting brackets 48. Each mounting bracket 48 has a raised, flat ridge running longitudinally along the middle of bracket 48 with two slots (not visible) designed to engage locking tab 46. Mounting brackets 48 are spaced apart from each other when mounted in bed 14 such that each locking tab 46 may engage one of mounting brackets 48.

A mounting pin 54 is inserted into each of two holes (not visible) extending through the sides of the ridge of the mounting bracket 48 and though complementary locking-pin-receiving holes 47 (visible in FIG. 5) aligned therewith in the vertical portion of locking tab 46 thereby attaching each apron 40, 42 to the mounting bracket 48. Use of pin 54 allows unit 10 to be easily and quickly removed from the truck bed 14, and then reinstalled.

Figure 3:
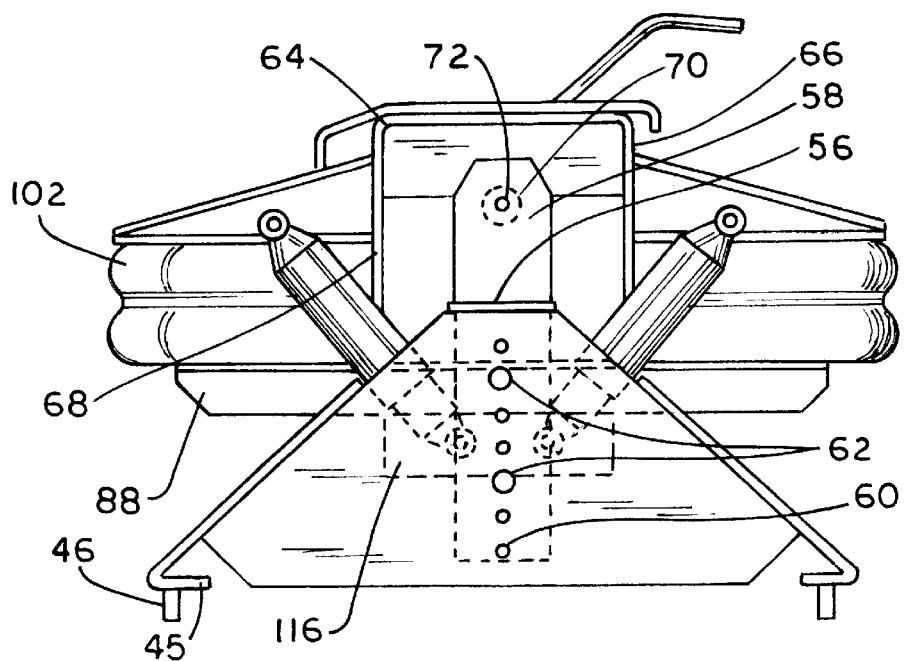
FIG. 3 is a side view of the connector apparatus of FIG. 2.

FIG. 3 shows the right side of the unit 10. Surrounding the perimeter of the openings in the right side horizontal shelf 28 and the left side horizontal shelf 38, are vertically raised collars 56. Each collar 56 provides a channel for a height-adjustment column 58. Height-adjustment column 58 is a tubular column of heavy-gauge metal having a regular, rectangular, horizontal cross-section dimensioned slightly narrower than collar 56 most of the vertical length of the column. A vertical line of holes 60 exists along the lines of symmetry of the right-side face 22 and left-side face 32. Two height-adjusting pins 62 extend through two respective holes on each side face 22, 32, to engage two vertical holes (not visible) located on the face of the respective height-adjustment column 58 to allow for the adjusting of the height of each column 58.

The saddle 64 sits at the top of the hitch unit 10 longitudinally parallel to the mounting brackets 48. The saddle 64 has a fore face 66 and an aft face 68. Bushings 70 are attached between the saddle 64 and height-adjusting columns 58 through bushing pins 72. Bushings 70 allow saddle 64 to rotate fore and aft.

Figure 4:
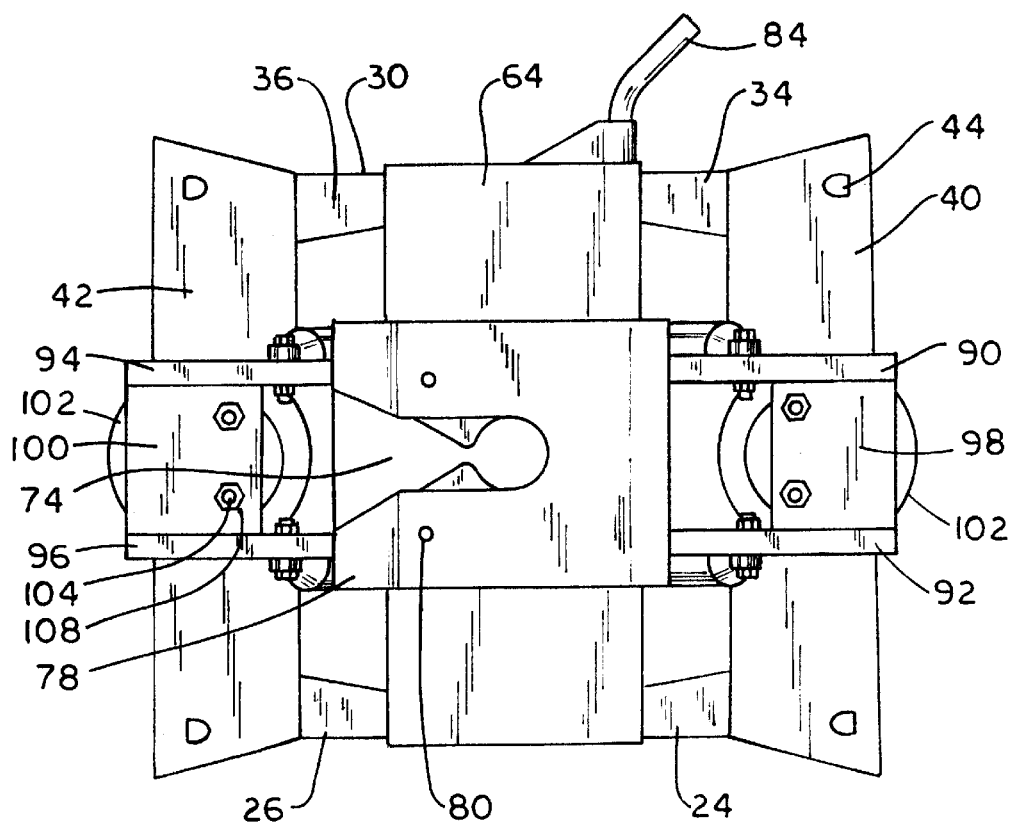
FIG. 4 is a top view of the connector apparatus of FIG. 2.
Figure 5:
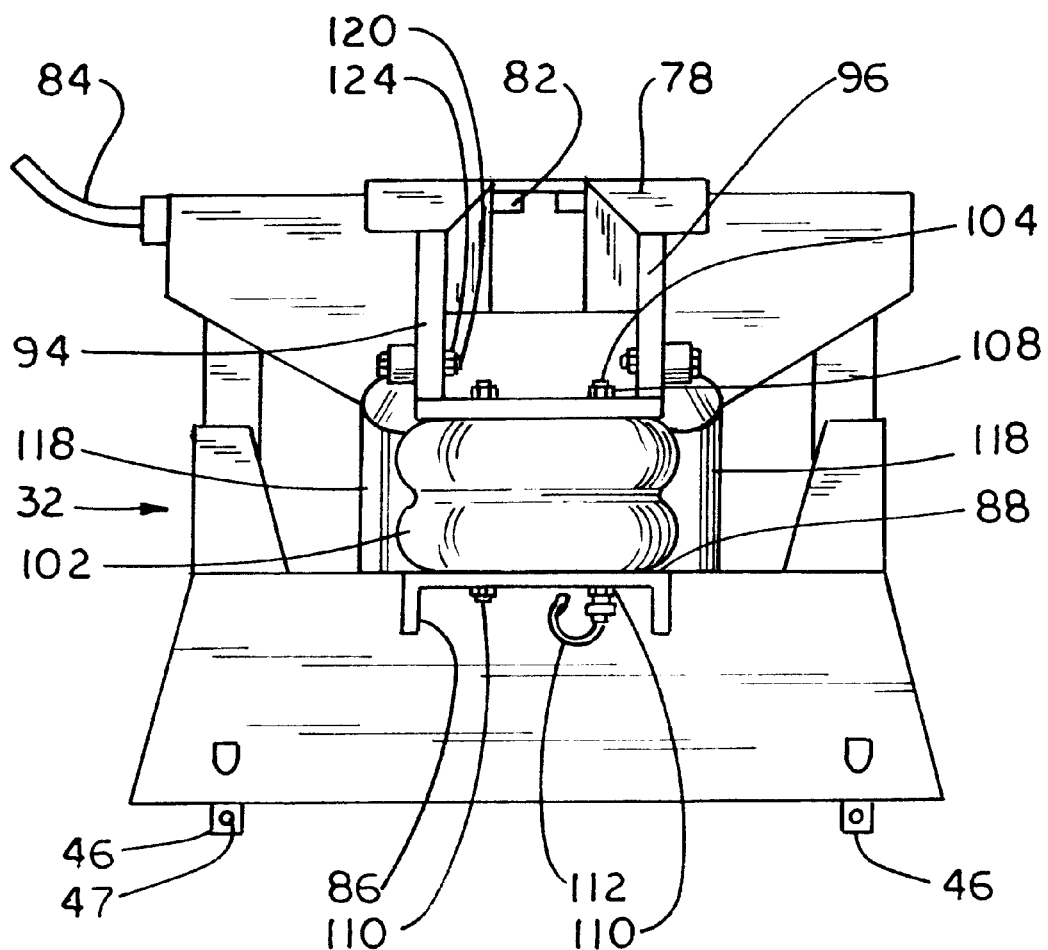
FIG. 5 is a aft end view of the connector apparatus of FIG. 2.

As seen in FIGS. 4 and 5, the center of the aft face 68 of the saddle 64 has a kingpin-receiving channel 74. Within channel 74 and extending down therefrom is a kingpin guide 76. Around channel 74 and on the aft side of guide 76 is a lapel 78. Lapel 78 is attached to saddle 64 by lapel bolts 80. Within the channel 74 is a locking mechanism 82 to hold the kingpin when kingpin assembly 18 is engaged. Locking mechanism 82 is manually activated by a handle 84. When the kingpin is within the channel 74, handle 84 is pulled activating a spring which closes locking mechanism 82 thereby holding the kingpin secure.

The above describes a unit of the prior art, for example, a REESE® Model 22K fifth-wheel hitch, which forms the base of the invention. Certain other prior art units further include a second set of bushings under the saddle and oriented perpendicular to the axle of a towing vehicle to allow the saddle to rock side to side.

A "C" shaped notch ½ inch wide, having a length of six inches and downward-extending legs of two inches, is removed from the center portion of the upper edge of fore apron 40 and aft apron 42. A lower deck 88 of six inch wide channel iron of approximately thirty-six inches of length is welded into the notches. The surface of lower deck 88 is thus fixedly horizontal and flush with the upper edge of aprons 40, 42.

FIGS. 2, 3, and 4 show triangular left fore support arm 90 and right fore support arm 92 are attached to the fore side of saddle 64. Each of the support arms 90, 92 is ½ inch thick steel. Fore support arms 90, 92 are parallel, set six inches on center. In a like manner, triangular left aft support arm 94 and right aft support arm 96 are attached to the aft side of the saddle. Attachment is best accomplished by welding. Welded to underside of the extreme fore ends of the fore support arms 90, 92 is a rectangular fore plate 98 about six inches wide. Welded to the underside of the extreme aft ends of the aft support arms 94, 96 is a rectangular aft plate 100 also about six inches wide. In this manner, fore and aft plates 98, 100 respectively, can rotate from a horizontal position as saddle 64 rotates fore and aft about bushings 70.

Between fore plate 98 and the deck 88, and again between aft plate 100 and deck 88, are air bellows 102. Air bellow 102 can be a standard, stock item, such as a FIRESTONE® 20/w01-358-6941 bellow, approximately 4.1 inches in bellow height with an upper and lower bead plate. Extending up from the upper bead plates are two threaded studs 104 which extend through stud-receiving apertures in the fore and aft plates 98, 100 where stud nuts 108 are screwed onto stud ends thereby securing separate bellows 102 to the fore and aft plates 98, 100. Extending down from each lower bead plate are two threaded stud/air-inlet nipple combinations 110 which extend through stud-receiving apertures in the fore and aft sides of deck 88 where stud nuts 108 are screwed onto stud ends such that a portion of the threaded end remains uncovered, thereby securing separate bellows 102 to the fore and aft sides of deck 88.

As seen in FIG. 5, air-supply line 112 of the type having threaded female-end connectors, are attached to one of the threaded stud/air-inlet nipple combinations 110 for each air-bellows. Air-supply lines 112 are also attached to a remote air compressor/actuator combination 114 (the air compressor may be mounted in truck bed 14, while the actuator may be mounted for convenience within the cab of truck 12 as depicted in FIG. 1). In this manner, the fore and aft bellows 102 may be disproportionately pressurized. Experience has shown that the optimal load on bellows 102 for any given trailer 16 and towing truck 12 combination will likely differ from an even 50/50 load split. Experience has further shown that the load division is most dependent on the physical characteristics of the truck 12, frailer 16, and location of the mount of the unit 10 within the truck bed 14, and relatively independent of the terrain upon which the vehicles will be operated. It is thus possible for a user to permanently set the appropriate pressure after one, initial extensive test drive after installation of the unit 10 with hook-up of the trailer 16 to the truck 12. Moreover, adjustments can easily be made should the user own more than one trailer, trade-in an original trailer for a new one, or should minor adjustments otherwise prove necessary.

As best seen in FIGS. 2, 3, welded to the each of the sides of channel iron deck 88 and depending from the middle thereof down approximately four inches, are two sheet metal shock-attachment plates 116. Four shock absorbers 118 are attached to the unit 10. Shock absorbers 118 are of a standard automobile-type shock absorbers, for example, Mongoose brand automobile shock absorbers. Two of the four shock absorbers 118 are attached to the aft end of unit 10, one on each side, while the other two shock absorbers 118 are attached to the fore end of unit 10, one on each side. The bottom of each of shock absorber 118 is attached to the outer surface of respective shock-attachment plates 116 with bolts 120 secured with nuts 124. The fore and aft shock absorbers 118 are separated at their points of attachment on shock-attachment plate 116 by about three inches. Each shock absorber 118 extends from its point of attachment to shock-attachment plate 116 outward and upward at about a forty-five degree angle to upper points of attachment on the respective support arms 90–96. The upper portion of the shock 118 is attached to respective support arm 90–96 by bolts 120 secured with nuts 124.

While the principles of this invention have been described in connection with specific embodiments, it should be understood clearly that these descriptions are made only by way of example and are not intended to limit the scope of the invention.

What is claimed is:

1. A connector apparatus for detachably, attaching a trailing vehicle to a towing vehicle, comprising:

a base structure having a top, and front and rear portions;

a kingpin-receiving plate having a front side and a back side, attached with respect to the top of the base structure and pivotable with respect thereto about a substantially horizontal cross-axis;

a front bottom deck with an upper surface, attached with respect to the front side of the base structure;

a rear bottom deck with an upper surface, attached with respect to the rear side of the base structure;

a front top deck with a lower surface, rigidly attached with respect to the front side of the kingpin-receiving plate thereby defining a gap of a distance between the upper surface of the front bottom deck and the lower surface of the front top deck;

a rear top deck with a lower surface, rigidly attached with respect to the rear side of the kingpin-receiving plate thereby defining a gap of a distance between the upper surface of the rear bottom deck and the lower surface of the rear top deck; and at least one resilient, variable-volume forward motion-dampening device between the upper surface of the front bottom deck and the lower surface of the front top deck whereby a change in the distance between the upper surface of the front bottom deck and the lower surface of the front top deck is resisted;

at least one resilient, variable-volume rearward motion-dampening device between the upper surface of the rear bottom deck and the lower surface of the rear top deck whereby a change in the distance between the upper surface of the rear bottom deck and the lower surface of the rear top deck is resisted; and at least one regulated volume-adjusting device attached with respect to the motion-dampening devices to selectively and independently adjust, and then maintain, the volumes of the at least one rearward motion-dampening device and the at least one forward motion-dampening device.

2. The motor vehicle connector of claim 1 wherein the at least one forward resilient motion-dampening device and the at least one rearward resilient motion-dampening device are fluid filled.

3. The motor vehicle connector of claim 2 wherein the at least one forward resilient motion-dampening device and the at least one rearward resilient motion-dampening device are air bellows.

4. The motor vehicle connector of claim 3 further comprising a plurality of shock absorbers attached with respect to the top decks and with respect to the bottom decks.

5. The motor vehicle connector of claim 4 wherein a pair of shock absorbers is attached with respect to each of the front and rear top decks and the base structure.

6. A connector apparatus for detachably, attaching a trailing vehicle to a towing vehicle, comprising:

a rigid base structure having a top, and front and rear portions;

a fifth-wheel plate having a front side and a back side, attached with respect to the top portion of the base structure and pivotable with respect thereto about a substantially horizontal cross-axis;

a front deck with an upper surface, attached with respect to the towing-vehicle bed on the front portion of the base structure;

a rear deck with an upper surface, attached with respect to the towing-vehicle bed on the rear portion of the base structure;

a front arm with a lower surface, rigidly attached with respect to the front side of the fifth-wheel plate thereby defining a gap of a distance between the upper surface of the front deck and the lower surface of the front arm;

a rear arm with a lower surface, rigidly attached with respect to the rear side of the fifth-wheel plate thereby defining a gap of a distance between the upper surface of the front deck and the lower surface of the front arm; and resilient, variable-volume motion-dampening devices located between the upper surfaces of the front and rear decks and the lower surfaces of the front and rear arms, respectively, in such a manner that a change in the volume of the resilient, variable-volume motion-dampening devices will not effect the vertical height of the horizontal axis, whereby a change in the distances between the upper surfaces of the front and rear decks and the lower surfaces of the front and rear arms, respectively, are resisted.

7. The connector apparatus of claim 6 wherein the resilient motion-dampening devices are fluid filled.

8. The connector apparatus of claim 7 wherein the fluid-filled resilient motion-dampening devices are air bellows.

9. The connector apparatus of claim 8 further comprising a plurality of shock absorbers attached with respect to the front and rear arms and front and rear decks.

10. The connector apparatus of claim 9 wherein at least one pair of shock absorbers is attached with respect to the front and rear arms and the base structure.

* * * * *